May 13, 1952 — C. T. SANDS, JR — 2,596,603
LIGHTING UNIT FOR AIRFIELDS
Filed April 21, 1947 — 2 SHEETS—SHEET 2
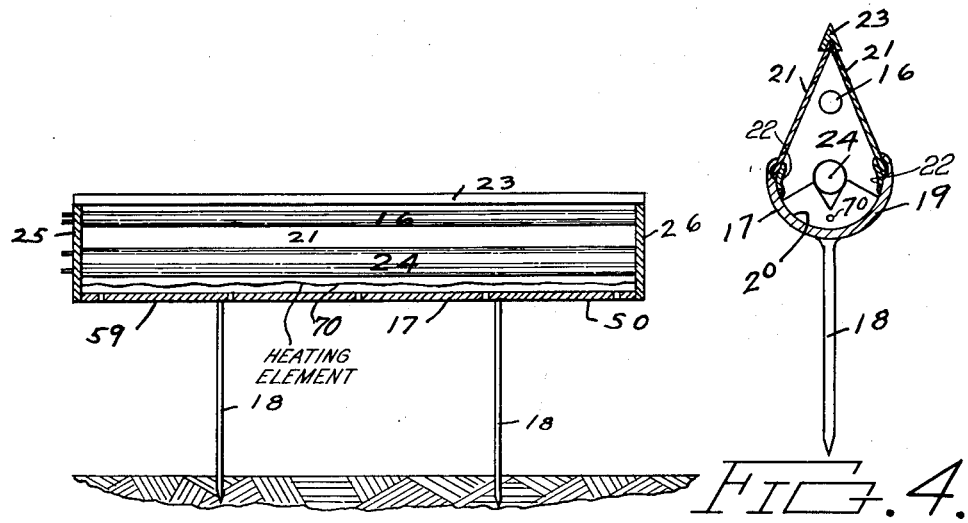
FIG. 3.
FIG. 4.
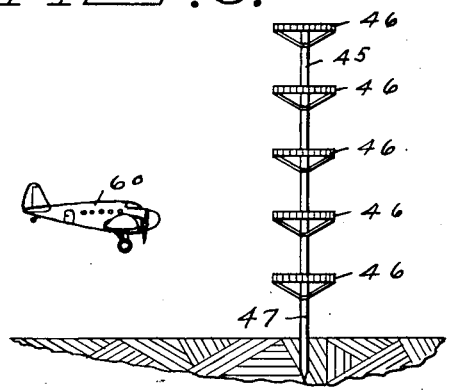
FIG. 2.
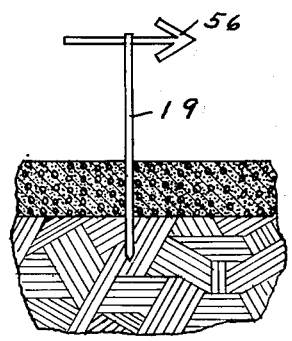
FIG. 5.
Inventor
CHARLES T. SANDS, JR.
By Howard J. Whelan.
Attorney Patented May 13, 1952

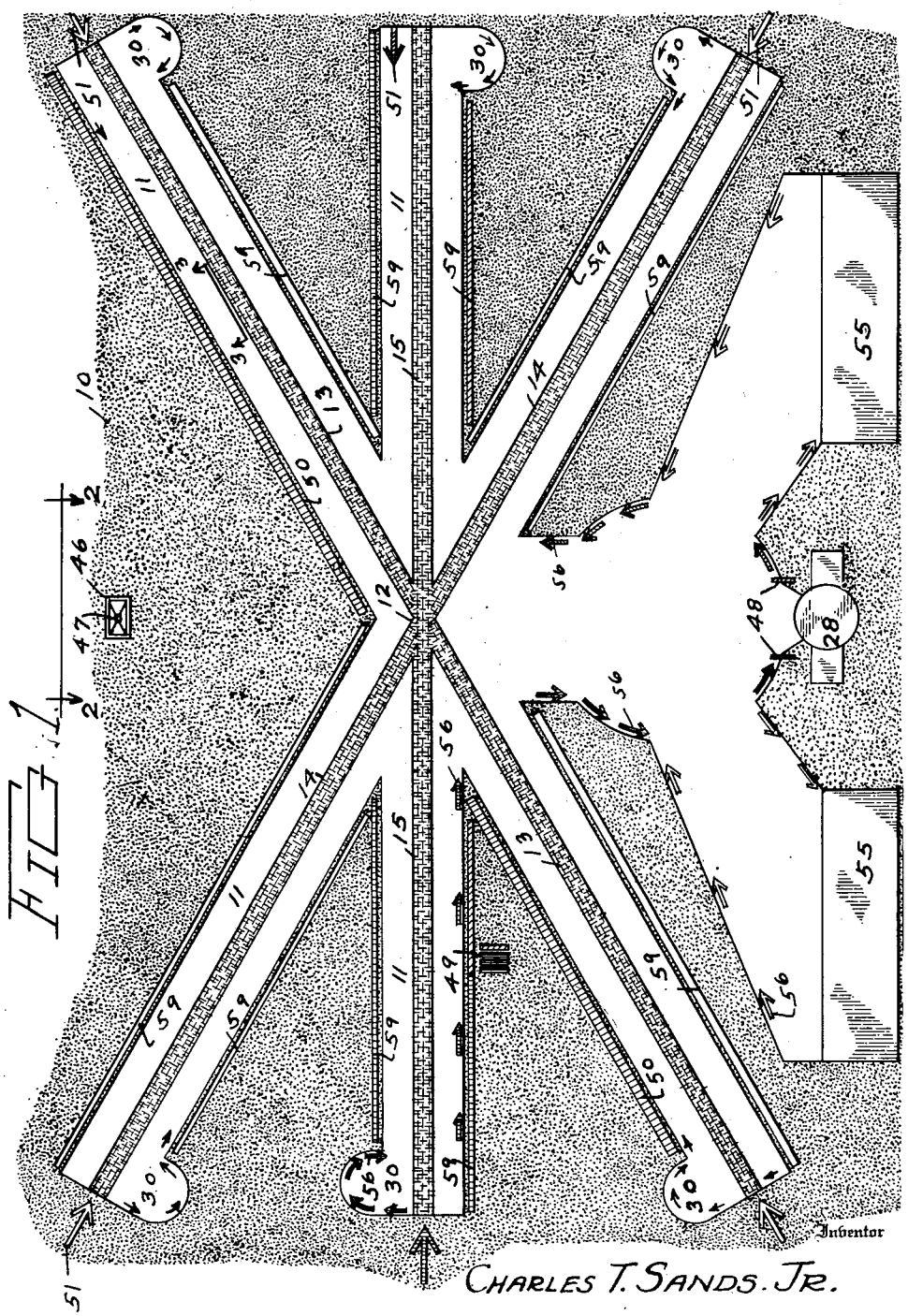

2,596,603

UNITED STATES PATENT OFFICE 2,596,603

LIGHTING UNIT FOR AIRFIELDS

Charles T. Sands, Jr., Baltimore, Md.

Application April 21, 1947, Serial No. 742,927

1 Claim. (Cl. 177—352)

This invention relates to airdromes and more particularly to a system for facilitating the landing of aircraft thereon.

In a particular system for facilitating the landing of aircraft on an airdrome or landing field, lights are provided so as to be lit along the landing strips to make their presence evident to the pilots of the arriving aircraft. The lights are usually spaced far apart and cannot be intelligently identified on foggy or misty days. The particular trouble with the system is that it does not designate the runways sufficiently, to make it possible for the pilot to accurately appreciate their respective positions or where they end or begin. The use of many lights in a bunch has also been tried without much success, especially where they are of the conventional incandescent type. This inadequate arrangement in the ordinary airfield is a great source of danger at the present time and has been the cause of fatal accidents within recent periods. In order to overcome the difficulties due to conventional lighting, attention has been diverted to other scientific auxiliaries. Thus radar has been given particular consideration and its use has been very successful within certain limitations. It operates indirectly however and does not take the place of the positive assurance that the clear visual discernment of the runways gives the pilot. Any system without providing visual clarity to the pilot, can be termed a makeshift no matter how scientific it may appear.

It is therefore an object of the present invention to provide a new and improved lighting system for the determination of the position of an airfield and its runways that will enable pilots to positively determine their exact location even when the weather is hazy, stormy or the celestial illumination is insufficient, and means to set out the planes height from the ground in visual lighting in conjunction with the ground lighting.

Another object of the invention is to provide a new and improved illuminating system for airfield runways that will enable them to be readily discerned in good or bad weather, and provide a clear indication of where they terminate or diverge and serve to visually instruct in a most effective manner the pilot as what to expect in regard to landing conditions, and also not be obscured by snow on the ground.

A further object of the present invention is to provide a new and improved illuminating system for airfield runways that will provide ample illumination in an economical manner without obstructing their use.

An additional object of the invention is to provide visual guidance to airplanes during foggy, rainy or other forms of bad weather and procedures to physically improve conditions at an airfield area.

Other objects will become apparent as the invention is more fully set forth.

For a better understanding of the invention and the objects thereof, reference is made to the drawings in which a particular form of the invention is illustrated. The accompanying specification explains the drawings and the parts and functions thereof, while the claim particularly points out the scope of the invention.

In the drawings:

Figure 1 is a plan view of airfield and runways with its system of illumination embodying this invention;

Figure 2 shows a view of the elevation tower looking in the direction of arrows 2—2 on Figure 1;

Figure 3 is a side elevation of the landing strip lights;

Figure 4 is an end view of Figure 3, and

Figure 5 is a side elevation of the arrows used to show turning points.

Similar reference characters refer to similar parts throughout the drawings.

An airfield 10 is laid out with a series of concrete runways 11 running in different directions and across at a central point 12. The end portions 30 of the runways are enlarged towards one side and serve as maneuvering or turning loci for the airplanes that use them. The area of the airfield around the runways 11 is of sand, grass or other type of ground incident to the geological features of the environment in the particular locality involved. In order to provide the air field with an arrangement that will facilitate its use under all kinds of weather conditions, especially during fog and rain, snow on the ground and at night, the runways 11, are divided and marked off by strips 13, 14 and 15, in reasonably wide bands of yellow, through their middle portions to enable them to be seen at a distance. A series of colored lights in housings 59 are positioned along the sides of the landing strips and may have their colors changed to suit the direction the plane 60 is landing from. They are accentuated when lighted, by the vertical supporting holders 17. These holders consist of stakes 18 that are high enough to bring the elongated lamp fixtures 19 above the deepest snow expected at the locality in question at any time. The fixtures 19 with their reflecting housings 20 are of semi-circular trough form pointing concavely upwards, so as to reflect the light of the red lamp 24 and the green lamp 16 used, in an upward direction. They are surmounted by double lenses or window panes 21 apexed upwardly, to protect the light and distribute it appropriately. The lenses or windows 21 are held in place by the side clips 22 arranged laterally along the fixtures 19. A ridge cap strip 23 is mounted on the apex of the windows, and is preferably of colored plastic to suit. The lamps 24 and 16 are preferably electrical and of neon or single wire type in lengths of about twelve feet. The lamps 24 and 16 are preferably in sets of two one over the other, and of different colors and diameters. They are arranged so that either color may be switched on at a time depending on the direction of the landing plane. The housing 19 is heated by conventional electrical heating units 70, which may be of the wire wound or molded type and of conventional design. The runway end portions 30, likewise have similar fixtures, but are arcuate longitudinally to designate circular turning paths at the ends of the runways.

This form of lighting is termed glow lining.

The fixtures 19 are arranged with socket and plugs contact ends 25 and 26 respectively, so that they may be joined continuously in a line. These lights not only show up brilliantly when turned on but also provide heat enough to dissipate any ice, snow and penetrate fog or mist in their vicinity.

The conductors and circuits supplying the lamps are run to a special switch panel erected in the administration building 28 of the air field. The panel is arranged with the various auxiliary switches which are indexed to show their purpose and what particular sections they control. A main switch controls all the circuits at one operation or may be used to outline the longest runway or the one selected for a special purpose.

The runways 11 are preferably, each a mile long, and when lit up can be observed by air plane pilots at a distance of several miles, even in foggy weather. The lighting becomes discernible for practical use for about a mile through fog, and since fog seldom exceeds a depth of over 5,000 feet, the lighted strips can guide the pilots to a safe landing under all such conditions. The use of different colored lines of light on the runways is new, although individually spaced lights have been used outside the runway area heretofore. Such individual lights do not penetrate the fog or rain conditions to a sufficient practical extent to make them valuable to the incoming pilot and are often confusing, especially when spaced apart. Fog and mist serve to distribute light from individual lamps of small size and make their locations uncertain.

The line of light units, by reason of their distinctive coloring, affords a visual picture of the air field to the pilot in long lines of definite delineation. This puts him in a position to use his visual discernment for his best judgement in making a landing or following the instructions conveyed by them to him as he interprets them. The lighting can also be used for signalling him in case the radio transmission system of the air field or air plane does not work properly or adequately. The invention affords safe landing under any weather conditions, and is not obscured by snow.

An elevation tower 45 is positioned on the field to assist the pilot in comparing the distance of his plane with the ground by comparing its height with one of the several red tubular lights 46 mounted on a post 47. Passenger barrier lights 48 are positioned at the control towers. A group of lights 49 called stop lights are positioned near the end of each runway 11 to advise the pilot when the end of the runway is near.

This system involves the use of a master red glow 50 which is positioned beside the longest runway on the airport and should be turned on long enough to bring the plane into actual sight of the strip which it is to use. The master light 50 can then be turned off and the landing strip light left on unless it is decided more assistance will be rendered by leaving the master light turned on.

At the ends 30 of each runway are lit arrows 51 which may show green at the entrance of the strip and the arrow at the end of the strip may show red depending which end the plane is landing on. Another lit arrow 56 mounted on fixture 19 is used to guide the plane to its selected destination.

The operation of a flying field or airport using this system of landing will be along the following outline: As soon as poor visibility presents itself the airport would turn on the Master Glow, radio and similar devices to bring the plane into the general location of the airport. The pilot locates the Master Glow and asks the airport for landing instructions. The landing strip he is to use is then turned on and the plane circles until he assumes the proper landing direction and lands over the green arrow at the end of the strip. The strip lights are visible at 3,000 feet. The red tube lights will appear on his right hand and the green on his left. The pilot flies onto the strip selected. The green light extends a shorter distance than the red light and when the green light is passed, the flyer comes to a stop and then follows the small red arrows positioned vertically around the selected runway to guide him to the desired location on the airport, whether it be the tower building 28, or the hanger 55.

While but one general form of the invention is shown in the drawings and described in the specifications, it is not desired to limit this application for patent to this particular form, as it is appreciated that other forms of construction could be made that would use the same principles and come within the scope of the appended claim.

Having thus described the invention, what is claimed is:

A lighting unit for airdromes comprising a longitudinal housing of semi-circular cross section, serving as a reflector, said housing being concave about the longitudinal axis thereof, closure members at each end of the housing, a plurality of elongated lamps of different colorings in said housing, said lamps having their terminals carried by the closure members, a pair of lenses anchored along the edges of said housing and apexed towards each other to form common meeting edges, a ridge cap of colored plastics mounted over the meeting edges to hold the lenses in contact, and a plurality of stakes secured to the bottom of the housing and of a length to maintain the housing above normal snow level.

CHARLES T. SANDS, JR.

(References on following page)

REFERENCES CITED

The following references are of record in the file of this patent:

UNITED STATES PATENTS

| Number | Name | Date |
|---|---|---|
| 1,404,962 | Hutchinson | Jan. 31, 1922 |
| 1,820,534 | Francotte | Aug. 25, 1931 |
| 1,850,490 | Bahl | Mar. 22, 1932 |
| 1,860,685 | Morris | May 31, 1932 |
| 1,903,847 | Wood | Apr. 18, 1933 |
| 1,961,116 | Van Braam | May 29, 1934 |
| 2,003,342 | Cavanaugh | June 4, 1935 |
| 2,155,295 | Bartow | Apr. 18, 1939 |
| 2,282,208 | Parsberg | May 5, 1942 |
| 2,284,535 | Orth | May 26, 1942 |
| 2,298,224 | Mudgett | Oct. 6, 1942 |
| 2,370,424 | Samuel | Feb. 27, 1945 |

FOREIGN PATENTS

| Number | Country | Date |
|---|---|---|
| 124,785 | Great Britain | Apr. 10, 1919 |

OTHER REFERENCES

Aviation News, page 12, December 3, 1945, U. S. Dept. of Commerce Aeronautics Bulletin, # 24, "The Federal Airways System," December 1, 1930, p. 15.